United States Patent
Wassmur (10) Patent No.: US 11,876,239 B2
(45) Date of Patent: Jan. 16, 2024

(54) DIRECTIONALLY CONTROLLED FAILURE OF ELECTRIC VEHICLE BATTERY TRAY

(71) Applicant: Polestar Performance AB, Gothenburg (SE)

(72) Inventor: Robert Wassmur, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 72 days.

(21) Appl. No.: 17/534,164

(22) Filed: Nov. 23, 2021

(65) Prior Publication Data
US 2023/0163390 A1    May 25, 2023

(51) Int. Cl.
*H01M 50/242*   (2021.01)
*B60K 1/04*   (2019.01)
*H01M 50/249*   (2021.01)

(52) U.S. Cl.
CPC ............ *H01M 50/242* (2021.01); *B60K 1/04* (2013.01); *H01M 50/249* (2021.01); *H01M 2220/20* (2013.01)

(58) Field of Classification Search
CPC ............ H01M 50/242; H01M 50/249; H01M 2220/20; B60K 1/04; B60K 2001/0438
See application file for complete search history.

(56) References Cited

U.S. PATENT DOCUMENTS

| | | | | |
|---|---|---|---|---|
| 5,474,408 A | * | 12/1995 | Dinitz | F16B 31/021 411/389 |
| 5,555,950 A | * | 9/1996 | Harada | H01M 50/209 180/68.5 |
| 10,272,949 B2 | * | 4/2019 | Faruque | B60K 1/04 |
| 10,720,620 B1 | * | 7/2020 | Grace | H01M 50/244 |
| 2006/0016633 A1 | * | 1/2006 | Fujii | B60L 50/66 180/68.5 |
| 2013/0270863 A1 | | 10/2013 | Frey et al. | |
| 2015/0197144 A1 | * | 7/2015 | Jarocki | B60L 50/64 180/68.5 |
| 2017/0029034 A1 | * | 2/2017 | Faruque | B62D 21/157 |
| 2017/0305250 A1 | | 10/2017 | Hara | |
| 2018/0208038 A1 | | 7/2018 | Ozawa et al. | |
| 2018/0323409 A1 | * | 11/2018 | Maier | H01M 50/242 |
| 2019/0312247 A1 | * | 10/2019 | Hilmann | H01M 10/6552 |

FOREIGN PATENT DOCUMENTS

| | | | | |
|---|---|---|---|---|
| DE | 102010050826 A1 | * | 5/2012 | ............... B60K 1/04 |
| JP | 2866998 B2 | | 3/1999 | |

OTHER PUBLICATIONS

Application No. PCT/EP2022/082919 , International Search Report and Written Opinion, dated May 4, 2023, 17 pages.

* cited by examiner

*Primary Examiner* — Frank B Vanaman
(74) *Attorney, Agent, or Firm* — Kilpatrick Townsend Stockton LLP (57) ABSTRACT

An electric vehicle including side impact battery pack protection mechanism for reducing damage to a battery pack in the event of a side impact, the electric vehicle including a vehicle frame, a battery pack, and one or more side impact battery pack protection brackets configured to at least of enable the vehicle battery pack to shift along a vehicle width direction or enable physical separation of the battery pack from the vehicle frame.

17 Claims, 5 Drawing Sheets

DIRECTIONALLY CONTROLLED FAILURE OF ELECTRIC VEHICLE BATTERY TRAY

TECHNICAL FIELD

The present disclosure relates generally to batteries for electric vehicles, and more particularly to mechanisms for reducing damage to batteries of electric vehicles due to load externally applied in a vehicle width direction.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. Most rechargeable battery packs are made up of one or more battery modules, each module containing a plurality of battery cells. In many cases, the rechargeable battery packs are enclosed in a rigid enclosure or housing that is assembled to the vehicle body. For example, the rechargeable battery pack may be assembled to the vehicle body at a location that is spaced from the front, rear and sides of the vehicle, often below the passenger compartment.

The central area under the passenger compartment is an ideal location for the rechargeable battery pack because it is spaced away from the outer body of the vehicle, and is thus protected by the subfloor cross car members, rocker assemblies, and underbody side frame structures of the vehicle. Positioning of the battery pack under the passenger compartment has proven effective in inhibiting damage to the battery pack in the event of full frontal and rear collisions. Rather, the most severe damage to the battery compartment occurs during side impacts, as side impacts may cause the floor structure of the vehicle to collapse towards the rechargeable battery pack, thereby increasing the risk of damage.

In rare circumstances, particularly when subjected to damage from a collision, individual battery cells within the battery pack can overheat. In extreme circumstances, the propagation of heat from the cell experiencing a thermal event can transfer to adjacent cells thereby raising the temperature of the adjacent cells to a point of propagation of the thermal event throughout the entire battery pack (sometimes referred to as a "thermal runaway"), thus destroying the entire battery pack and potentially the electric vehicle.

Thus, although safety of the occupants of the vehicle during a crash remains the highest priority, various efforts have also been made to protect the rechargeable battery pack from damage in the event of a collision, particularly side impact collisions. One approach has been to provide a large (e.g., 8 inches or more) collapsible member (sometimes referred to as a "crumple zone") on both sides of the floor alongside of the battery pack. Other approaches include strengthening the body structure, potentially through the addition of structural supporting beams and cross members within and around the battery enclosure. Although such advances work reasonably well for their intended purpose, these approaches add bulk and weight to the vehicle, which adversely affects fuel economy. The present disclosure addresses this concern.

SUMMARY OF THE DISCLOSURE

Embodiments of the present disclosure provide mechanisms for reducing damage to a rechargeable battery pack of electric vehicles due to a load externally applied to a vehicle. For example, the external load could be applied in width direction in the event of a side collision; although mechanisms for reducing damage from loads applied from front, rear and quartering collisions are also contemplated. One embodiment of the present disclosure provides a side impact battery pack protection bracket system configured to enable an electric vehicle battery pack to shift along the vehicle width direction, the side-impact battery protection bracket system including a first compression load absorption member operably coupled to a first side of an electric vehicle and a first connection member operably coupled to a first side of a battery pack, wherein the first compression load member is secured to the first connection member by a first breakaway element, and a second compression load absorption member operably coupled to a second side of an electric vehicle and a second connection member operably coupled to a second side of a battery pack, wherein the second compression load member is secured to the second connection member by a second breakaway element, wherein in the event of an application of an external force to a side of the electric vehicle either of the first or second breakaway elements break, thereby creating a separation between the respective compression load absorption member and connection member, while the compression load absorption member positioned on the opposite side of the battery pack compresses, thereby dissipating the external force transmitted to the battery pack.

In one embodiment, each of the first and second compression load absorption members comprise a thin-walled structure having a plurality of walls defining a hollow interior configured to collapse upon the application of an external force of a defined magnitude. In one embodiment, each of the first and second compression load absorption members are configured to buckle upon application of an external force of a defined magnitude, wherein the external force of a defined magnitude is lower than a force capable of deforming the battery pack. In one embodiment, each of the first and second compression load absorption members comprise an attachment tab configured to enable operable coupling of the compression load absorption member to the respective connection member. In one embodiment, the first compression load absorption member and the first connection member define a first aperture in which the first breakaway element is positioned, and wherein the second compression load absorption member and the second connection member define a second aperture in which the second breakaway element is positioned. In one embodiment, the first and second breakaway elements are in the form of shear pins configured to separate upon the application of a shear force of a defined magnitude. In one embodiment, each of the connection members define one or more steps or contours configured to correspondingly mate with one or more steps or contours defined by each of the compression load absorption members, thereby enabling a weight of the battery pack to be distributed over a larger surface area of the compressive load absorption members.

Another embodiment of the present disclosure provides a side impact battery pack release bracket configured to enable physical separation of a battery pack from an electric vehicle, the side-impact battery release bracket including a first lateral connection member operably coupled to a frame of an electric vehicle, the first lateral connection member having a first angled face positioned at an acute angle relative to a horizontal axis of the electric vehicle, a second lateral connection member operably coupled to a battery pack, the second lateral member having a second angled face configured to mate with the first angled face, such that the first and second angled faces are positioned against one another and a generally planar configuration, and a breakaway element configured to secure the first lateral connection member to the second lateral connection member, whereupon application of an external force to a side of the vehicle causes a shear force between the first angled face and the second angled face, causing the breakaway element to break into two or more parts, thereby providing a disconnection between the first lateral member and the second lateral member.

In one embodiment, the first angled face is positioned at an angle of 45° relative to at least one of an x- or y axis of the electric vehicle. In one embodiment, the breakaway element is in the form of a shear pin configured to separate upon the application of a shear force of a defined magnitude. In one embodiment, a momentum of the battery pack can aid in separation of the battery pack from the vehicle.

Another embodiment of the present disclosure provides an electric vehicle including a side impact battery pack protection mechanism for reducing damage to a battery pack in the event of a side impact, the electric vehicle including a vehicle frame, a battery pack, and one or more side impact battery pack protection brackets configured to at least enable the vehicle battery pack to shift along a vehicle width direction or enable physical separation of the battery pack from the vehicle frame.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Figure 1:
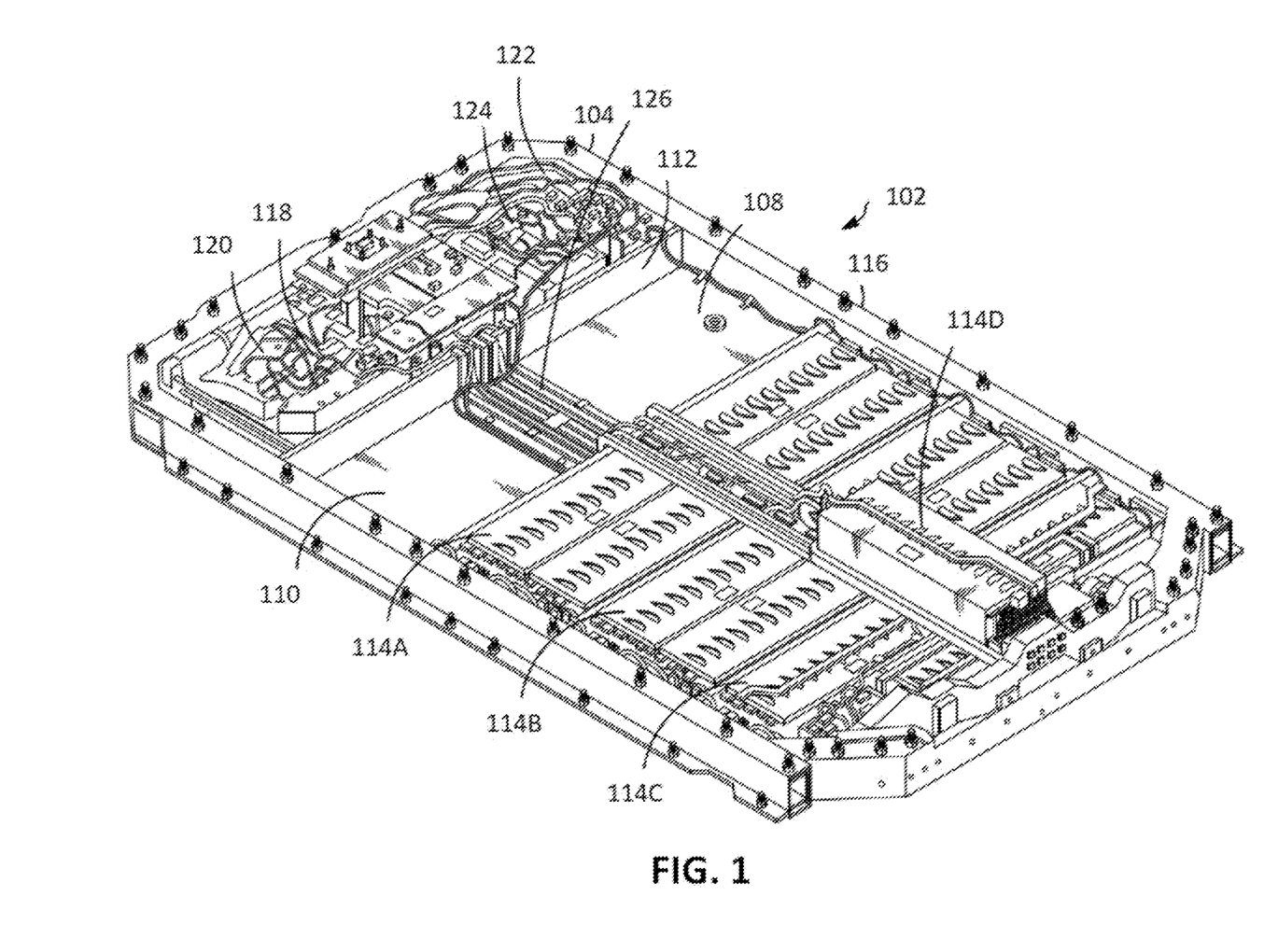
FIG. 1 is a perspective view depicting an electric vehicle battery pack operably coupleable to an electric vehicle via one or more mechanisms for reducing damage to a battery pack in the event of a side impact, in accordance with an embodiment of the disclosure.

Referring to FIG. 1, an electric vehicle battery pack 102 operably coupled to an electric vehicle via one or more mechanisms for reducing damage to the battery pack 102 due to a load externally applied in a vehicle width direction, is depicted in accordance with embodiments of the disclosure. In embodiments, contents of the battery pack 102 can be contained within a battery tray 104 including a cover, thereby creating a sealable battery cell compartment containing clusters of individual battery cells and other battery related components.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

As depicted, the battery tray 104 can represent a bottom and one or more sides of a structural vessel 108 defining a compartment 110. Further, in embodiments, the battery tray 104 can include one or more structural supports, such as cross members 112, which can provide structural support to the battery pack 102, as well as surfaces within the compartment 110 on which other components of the battery pack can be affixed.

As depicted, the individual battery cells are grouped into distinct clusters 114A-D (sometimes referred to as "battery modules"). In addition to the battery modules 114A-D, a variety of components can be packed into the compartment 110 before a cover is affixed to a top surface 116 of the battery tray 106, thereby sealing the compartment 110. In some embodiments, the components can include an electrical current transmission system 118, safety system 120, battery management system 122 (including current management system 124), and a battery bus bar 126 interconnecting the various components 114A-D, 120, 122, and 124. Once the components have been positioned within the compartment 110, the cover can be affixed to the top surface 116 via a plurality of fasteners, adhesive, or a combination thereof.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells.

The battery pack 102 has many sources of heat which may contribute to abnormal thermal characteristics of any given cell (e.g., above a desired temperature range). The source of heat may be created internally (e.g., within the cells) or may originate from an external source (e.g., outside of the cell or battery tray 104). One internal heat source can occur when one or more individual cells experience a high rate of discharge, which may occur when the vehicle is under heavy acceleration and/or driving up a hill, etc. This type of internal heat is considered part of the normal operation of the vehicle, but is monitored for exceptional circumstances, which may occur during extremely hot weather or other predetermined or unforeseen circumstances. Abnormal thermal characteristics within an individual cell can also occur as a result of damage (e.g., impact, crushing, etc.), which can result in a thermal runaway.

The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use. In the event that a single cell experiences an over temperature event, the heat produced by the overheated cell may transfer heat energy to adjacent cells (e.g., within a module 114) thereby raising the temperature of the adjacent cells to a point of propagation of the thermal event throughout the entire battery pack 102. For example, self-ignition of a battery cell may occur when the temperature of the cell reaches a temperature in a range of between about 120° C. and about 150° C.

Conventional electric vehicle designs typically position the battery pack 102 below the passenger compartment, which is generally considered an ideal location as the battery pack maintains a low center of gravity of the vehicle, and is spaced away from the outer body of the vehicle, and therefore less prone to being damaged in a collision. Conventional positioning of battery packs under the passenger compartment has proven effective in inhibiting excessive damage to the battery pack in the event of a full frontal or rear collision. By contrast, conventional designs are less effective at preventing damage from a side impact. Specifically, when a side of the vehicle is impacted, a rocker assembly positioned along a lower side of the vehicle can collapse inwardly toward the battery pack 102, potentially rupturing the battery tray 104 and damaging the battery cells/modules 114 positioned therein.

In rare circumstances, particularly when subjected to damage from a collision, individual battery cells within the battery pack can overheat. In extreme circumstances, the propagation of heat from the cell experiencing a thermal event can transfer to adjacent cells thereby raising the temperature of the adjacent cells to a point of propagation of the thermal event throughout the entire battery pack (sometimes referred to as a "thermal runaway"), thus destroying the entire battery pack and potentially the electric vehicle.

To inhibit such a chain reaction thermal event, in some embodiments, one or more mechanisms coupling the battery pack 102 to the vehicle can be employed for reducing damage to batteries of electric vehicles due to a load externally applied in a vehicle width direction. Specifically, in some embodiments, the one or more mechanisms can be configured to enable the battery pack 102 to shift crosswise (e.g., along the vehicle width direction) to avoid deformation or rupture of the battery tray 104 in the event of a collapse of the rocker assembly. In other embodiments, the one or more mechanisms can be configured to cause a physical separation of the battery pack 102 from the vehicle, thereby creating a physical distance between the battery pack experiencing the thermal event and the vehicle, for the purpose of inhibiting further damage to the vehicle and/or injury to the occupants thereof.

Figure 2A:
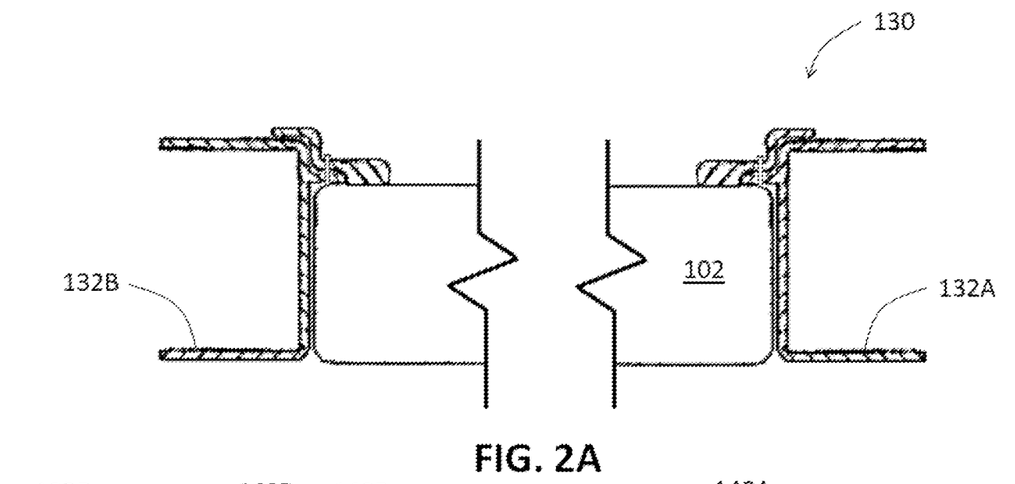
FIG. 2A is a cross-sectional view depicting a side-impact battery protection bracket configured to enable an electric vehicle battery pack to shift along a vehicle width direction in accordance with an embodiment of the disclosure.
Figure 2B:
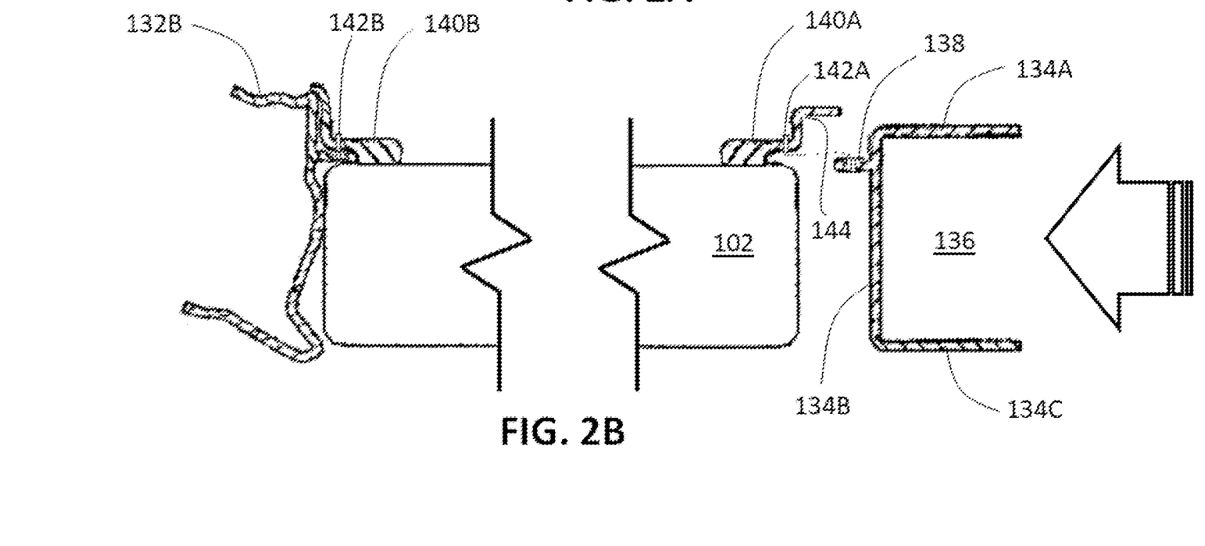
FIG. 2B is the side-impact battery protection bracket of FIG. 2B following a side-impact, in accordance with an embodiment of the disclosure.

Referring to FIGS. 2A-B, a side impact battery pack protection bracket 130 configured to enable the battery pack 102 to shift laterally or crosswise along the vehicle width direction to avoid the deformation or rupture, is depicted in accordance with an embodiment of the disclosure. Enabling the battery pack 102 to shift laterally can significantly reduce or eliminate damage to the battery cells/modules in the event of a side impact. FIG. 2A depicts the side impact battery pack protection bracket 130 in a normal configuration, while FIG. 2B depicts the side impact battery pack protection bracket 130 in a deformed state following a side impact.

In embodiments, the bracket 130 can include a pair of compressive load absorption members 132A/B positioned on opposing sides of the battery pack 102. For example, in some embodiments, the compressive load absorption members 132A/B can be positioned in proximity to a rocker panel or similar such structure of the vehicle, thereby providing a secure attachment point to operably couple the battery pack 102 to the vehicle frame. In some embodiments, the compressive load absorption members 132A/B can comprise a thin-walled structure, the thin-walled structure having a plurality of walls 134A-C defining a hollow interior 136. In embodiments, an attachment tab or ridge 138 can extend from one of the plurality of walls 134B, wherein the attachment tab or ridge 138 is configured to enable operable coupling of the compressive load absorption members 132A/B to the battery pack 102, for example, via corresponding pair of connection member 140A/B and a breakaway element 142A/B (e.g., a shear pin or the like).

In some embodiments, the connection members 140A/B can define one or more steps or contours 144 configured to mate with one or more of the plurality of walls 134A-C of the compressive load absorption members 132A/B, thereby enabling the weight of the battery pack 102 to be distributed over a larger surface area of the compressive load absorption member 132A/B. Further, the connection members 140A/B can define an aperture through which a breakaway element 142A/B can pass, thereby fastening the connection member 140A/B to the compressive load absorption member 132A/B.

In embodiments, the compressive load absorption members 132A/B can have a designed to withstand a larger tensile force than compressive force before deformation occurs. For example, in some embodiments, the compressive load absorption members 132A/B can be designed to buckle or collapse upon the application of an external compressive load or force, which in some cases can be transferred through a portion of the battery pack 102. By contrast, the compressive load absorption members 132A/B may be able to withstand a load or force of an equal magnitude applied in a tensile direction without appreciable deformation.

To further inhibit deformation in the tensile direction, in some embodiments, the breakaway element 142A/B, which can be in the form of a shear pin or the like, can be configured to enable separation of the connection member 140A/B from one of the compressive load absorption members 132A, thereby enabling any inertia of the battery pack 102 to absorbed primarily by the opposing compressive load absorption member 132B. Specifically, upon the application of a sufficient shear force, the breakaway element 142A/B can be configured to break apart, thereby a force experienced by the battery pack 102 to pull the connection member 140A away from the compressive load absorption member 132A. in embodiments, the connection members 140A and compressive load absorption members 132A can be specifically designed to enable ease in separation in the tensile direction.

By contrast, application of force in the compressive direction can serve to maintain physical connection between the connection member 140B and the compressive load absorption members 132B, such that at least a portion of a force experienced by the battery pack 102 is transferred to the compressive load absorption member 132B. The compressive load absorption member 132B can be designed to absorb and dissipate force transferred from the battery pack 102 through compressive deformation or buckling, thereby preserving the integrity of the battery pack 102. Further, lateral shifting of the battery pack 102 via the side impact battery pack protection brackets 130 enables the impact side of the vehicle to be crushed inwardly without impinging upon the battery pack 102.

Figure 3:
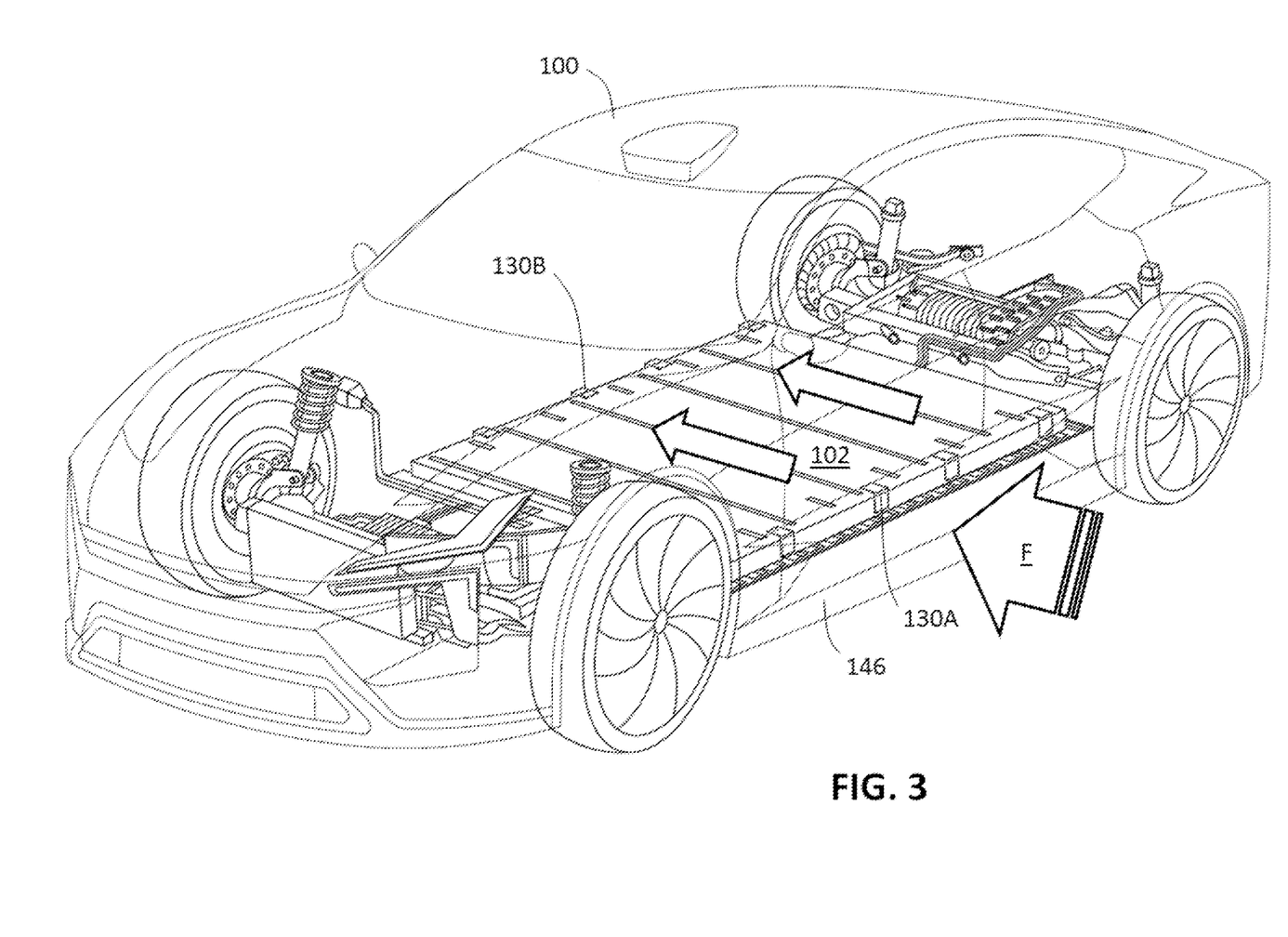
FIG. 3 is a perspective, schematic view depicting an electric vehicle having a side-impact battery protection bracket system configured to enable a battery pack to shift along the vehicle width direction upon a side-impact, in accordance with an embodiment of the disclosure.

Accordingly, with further reference to FIG. 3, in the event of an application of a large external force (F) to a side of the vehicle (e.g., a side impact) one or more side impact battery pack protection brackets 130A positioned on an impact side of the vehicle can enable separation of the battery pack 102 from the vehicle frame 146 on the impact side of the vehicle. Upon separation, one or more side impact battery protection brackets 130B positioned on opposite side of the vehicle to deform or compress, thereby absorbing and dissipating energy from the battery pack 102. Thus, embodiments of the present disclosure enable impact energy absorbing mechanisms configured to reduce shock absorbed by the battery pack 102, thereby decreasing the likelihood of a thermal event (e.g., thermal runaway) as a result of rupture or deformation of the battery pack following an impact on a lateral side of the vehicle.

Figure 4A:
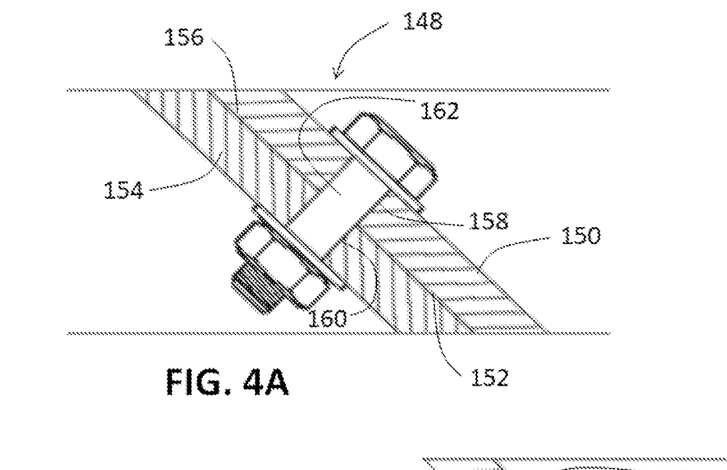
FIG. 4A is a cross-sectional view depicting a side-impact battery release bracket configured to enable physical separation of a battery pack from an electric vehicle, in accordance with an embodiment of the disclosure.
Figure 4B:
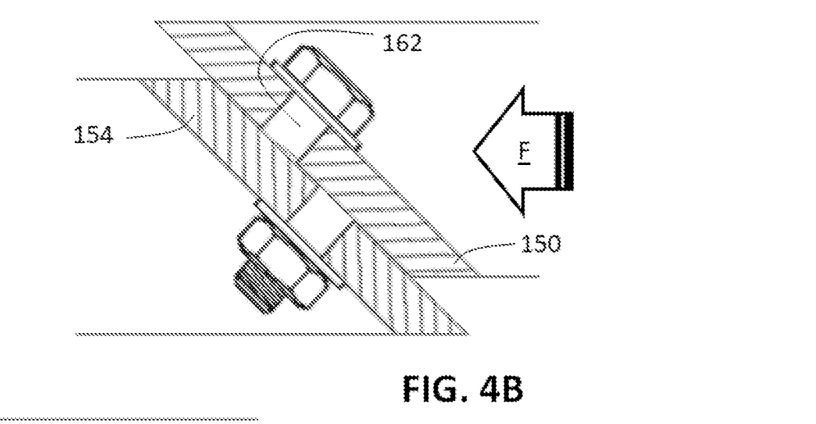
FIGS. 4B-C is the side-impact battery release bracket of FIG. 4A following a side impact, in accordance with an embodiment of the disclosure.
Figure 4C:
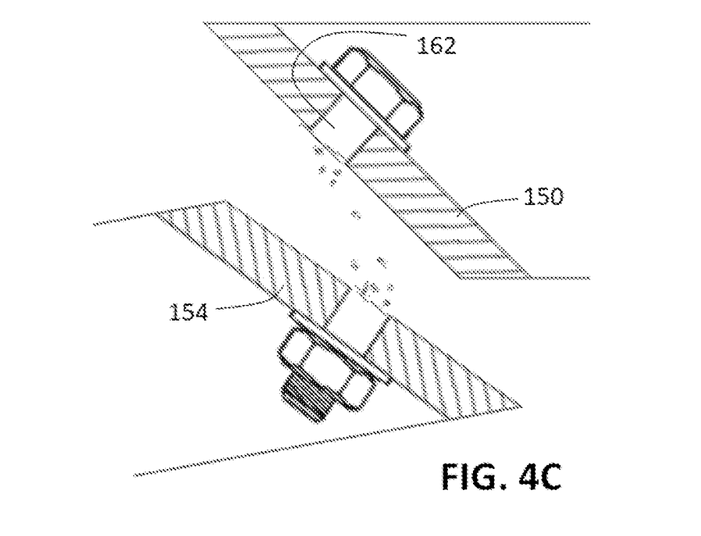

In another embodiment, the vehicle can include one or more brackets configured to enable physical separation of the battery pack 102 from the vehicle in the event of a side impact, thereby creating a physical distance between the battery pack 102 and the vehicle for the purpose of inhibiting damage to the vehicle and/or injury to the occupants thereof in the event of a thermal runaway following a side impact. Referring to FIGS. 4A-C, a side impact separation bracket 148 configured to enable physical separation of the battery pack 102 from the vehicle, is depicted in accordance with an embodiment of the disclosure. As illustrated, FIG. 4A depicts the side impact separation bracket 140 in a normal configuration, while FIGS. 4B-C depict the side impact separation bracket 140 following a side impact.

In some embodiments, the side impact bracket 148 can include a first lateral connection member 150, wherein the first lateral connection member 150 has an angled face 152 positioned at an acute angle relative to horizontal axis (x- or y-axis) of the vehicle. For example, in some embodiments, the angled face 152 of the first lateral connection member 150 can be positioned at a downward facing acute angle (e.g., 45°, etc.) with respect to a horizontal axis, such that the angled face 152 angles away from the body of the vehicle (e.g., towards the ground). For example, in some embodiments, the first lateral connection member can be positioned in proximity to a rocker panel or similar such structure of the vehicle, thereby providing a secure attachment point to operably couple the battery pack 102 to the vehicle frame.

A second lateral connection member 154 having a corresponding second angled face 156 can be configured to mate with the first lateral connection member 150, such that the angled faces 152, 156 are positioned against one another in a generally flat configuration. In some embodiments, the second lateral connection member 154 can be operably coupled to the battery tray 104. For example, in some embodiments, the second lateral connection member 154 can be integrally molded into a portion of the battery tray 104, so as to represent a component of the battery pack 102. Other embodiments are also contemplated.

In embodiments, aperture 158, 160 can be defined in the first and second lateral connection members 150, 154, such that a breakaway element 162 can be positioned therein, thereby coupling the first lateral connection member 150 to the second lateral connection member 154. In the event of a side impact, a force (F) imparted on the first lateral connection member 150 can cause create a shear force between the first angled face 152 and the second angled face 156. As depicted in FIG. 4B, where the shear force exceeds a defined threshold, the breakaway element 162, which can be designed to shear at a designated shear force, can separate, breaking into two or more parts, thereby providing a disconnection between the first lateral member 150 and the second lateral member 154. Thereafter, as depicted in FIG. 4C, the second lateral member 154 can fall away from or separate from the first lateral member 150. For example, a momentum or transfer of energy to the battery pack 102 can aid in separation of the battery pack 102 from the vehicle.

Figure 5:
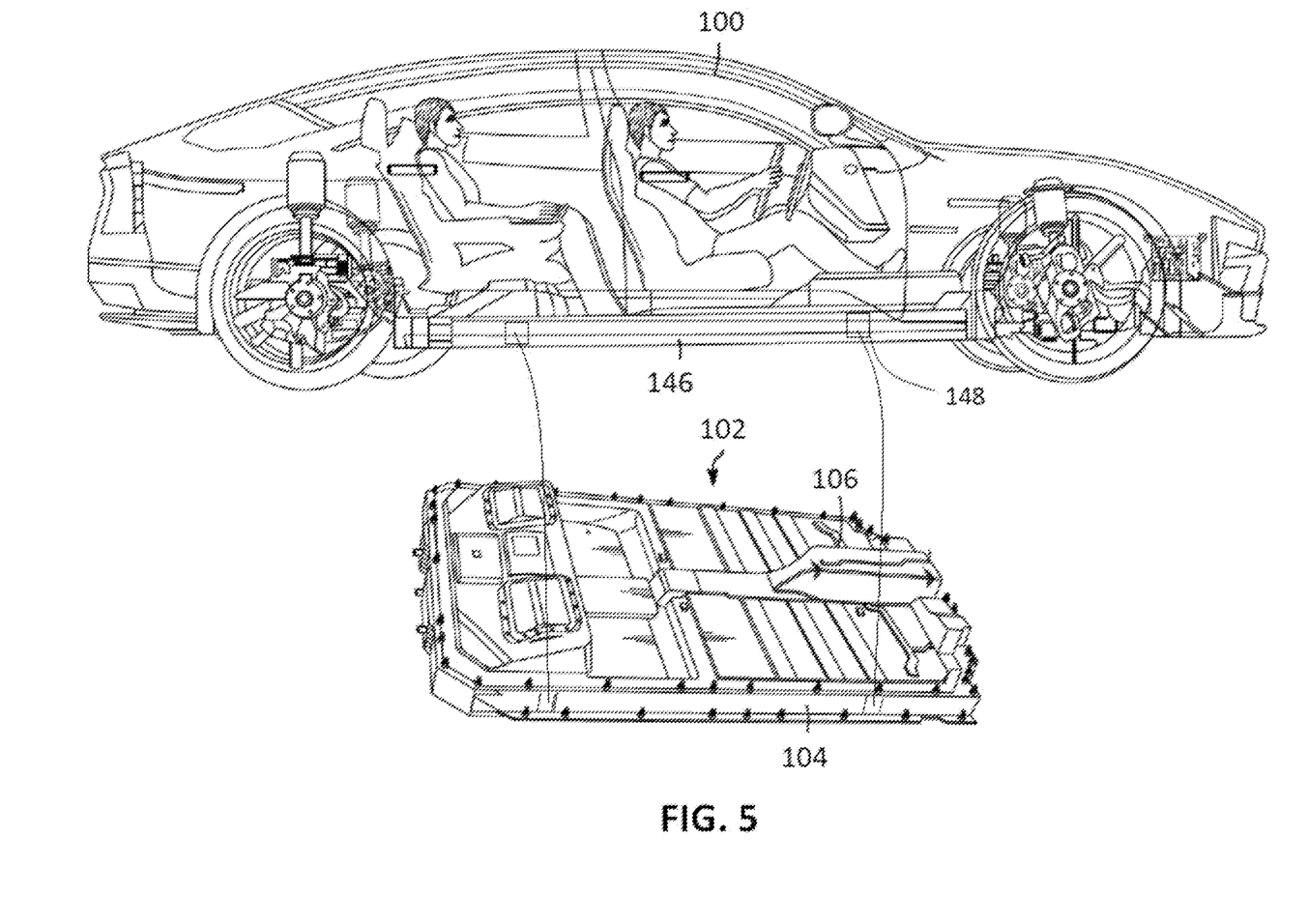
FIG. 5 is a perspective, schematic view depicting an electric vehicle having a side-impact battery protection bracket system configured to enable physical separation of a battery pack from the vehicle upon experiencing a side-impact, in accordance with an embodiment of the disclosure.

Accordingly, with further reference to FIG. 5, in the event side collision, one or more side impact separation brackets 148 can enable separation of the battery pack 102 from the vehicle frame 146. Specifically, imparting an external force upon the side impact separation bracket 148 can cause a shear force between beveled angle on a first face and a corresponding beveled angle on a second face. Upon the shear force exceeding a defined threshold, a breakaway element (shear pin, fastener, or the like) can separate, thereby causing the battery pack 102 to physically separate from the vehicle 100.

Moreover, in some embodiments, side impact separation brackets 148 positioned on opposite sides of the vehicle can cooperate with one another to forcibly which the battery pack 102 out of the vehicle 100 should the sides (e.g., rocker panel, etc.) of the vehicle deform towards one another. Thus, embodiments of the present disclosure enable impact energy dissipating mechanisms configured to reduce shock absorbed by the battery pack 102, thereby decreasing the likelihood of a thermal event (e.g., thermal runaway) as a result of rupture or deformation of the battery pack following an impact on a lateral side of the vehicle.

The invention is further illustrated by the following embodiments:

An electric vehicle including side impact battery pack protection mechanism for educing damage to a battery pack in the event of a side impact, the electric vehicle comprising:
  a vehicle frame;
  a battery pack; and
  one or more side impact battery pack protection brackets configured to at least of enable the vehicle battery pack to shift along a vehicle width direction or enable physical separation of the battery pack from the vehicle frame.

A system or method according to any embodiment, wherein the one or more side impact battery pack protection brackets comprises:
  a first compression load absorption member operably coupled to a first side of an electric vehicle and a first connection member operably coupled to a first side of a battery pack, wherein the first compression load member is secured to the first connection member by a first breakaway element; and
  a second compression load absorption member operably coupled to a second side of an electric vehicle and a second connection member operably coupled to a second side of a battery pack, wherein the second compression load member is secured to the second connection member by a second breakaway element;
  wherein in the event of an application of an external force to a side of the electric vehicle either of the first or second breakaway elements break, thereby creating a separation between the respective compression load absorption member and connection member, while the compression load absorption member positioned on the opposite side of the battery pack compresses, thereby dissipating the external force transmitted to the battery pack.

A system or method according to any embodiment, wherein each of the first and second compression load absorption members comprise a thin-walled structure having a plurality of walls defining a hollow interior configured to collapse upon the application of an external force of a defined magnitude.

A system or method according to any embodiment, wherein each of the first and second compression load absorption members are configured to buckle upon application of an external force of a defined magnitude, wherein the external force of a defined magnitude is lower than a force capable of deforming the battery pack.

A system or method according to any embodiment, wherein each of the first and second compression load absorption members comprise an attachment tab configured to enable operable coupling of the compression load absorption member to the respective connection member.

A system or method according to any embodiment, wherein the first compression load absorption member and the first connection member define a first aperture in which the first breakaway element is positioned, and wherein the second compression load absorption member and the second connection member define a second aperture in which the second breakaway element is positioned.

A system or method according to any embodiment, wherein the first and second breakaway elements are in the form of shear pins configured to separate upon the application of a shear force of a defined magnitude.

A system or method according to any embodiment, wherein each of the first and second connection members define one or more steps or contours configured to correspondingly meet with one or more steps or contours defined by each of the compression load absorption members, thereby enabling a weight of the battery pack to be distributed over a larger surface area of the compressive load absorption members.

A system or method according to any embodiment, wherein one or more side impact battery pack protection brackets comprise:
  a first lateral connection member operably coupled to a frame of an electric vehicle, the first lateral connection member having a first angled face positioned at an acute angle relative to a horizontal axis of the electric vehicle;
  a second lateral connection member operably coupled to a battery pack, the second lateral member having a second angled face positioned configured to mate with the first angled face, such that the first and second angled faces are positioned against one another and a generally planar configuration; and
  a breakaway element configured to secure the first lateral connection member to the second lateral connection member, whereupon application an external force to a side of the vehicle causes a shear force between the first angled face and the second angled face, causing the breakaway element to break into two or more parts, thereby providing a disconnection between the first lateral member and the second lateral member.

A system or method according to any embodiment, wherein the first angled face is positioned at an angle of 45° over last relative to at least one of an x- or y axis of the electric vehicle.

A system or method according to any embodiment, wherein the breakaway element is in the form of a shear pin configured to separate upon the application of a shear force of a defined magnitude.

A system or method according to any embodiment, wherein a momentum of the battery pack can aid in separation of the battery pack from the vehicle.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. A side impact battery pack protection bracket system configured to enable an electric vehicle battery pack to shift along a vehicle width direction, the side impact battery protection bracket system comprising:
    a first compression load absorption member operably coupled to a first side of an electric vehicle and a first connection member operably coupled to a first side of a battery pack, wherein the first compression load member is secured to the first connection member by a first breakaway element; and
    a second compression load absorption member operably coupled to a second side of the electric vehicle and a second connection member operably coupled to a second side of the battery pack, wherein the second compression load member is secured to the second connection member by a second breakaway element;
    wherein in the event of an application of an external force to a side of the electric vehicle either of the first or second breakaway elements break, thereby creating a separation between the respective compression load absorption member and connection member, while the compression load absorption member positioned on the opposite side of the battery pack compresses, thereby dissipating the external force transmitted to the battery pack and
    wherein each of the first and second compression load absorption members are configured to buckle upon application of the external force of a defined magnitude, wherein the external force of the defined magnitude is lower than a force capable of deforming the battery pack.

2. The side impact battery protection bracket system of claim 1, wherein each of the first and second compression load absorption members comprise a thin-walled structure having a plurality of walls defining a hollow interior configured to collapse upon the application of the external force of the defined magnitude.

3. The side impact battery protection bracket system of claim 1, wherein each of the first and second compression load absorption members comprise an attachment tab configured to enable operable coupling of the compression load absorption member to the respective connection member.

4. The side impact battery protection bracket system of claim 1, wherein the first compression load absorption member and the first connection member define a first aperture in which the first breakaway element is positioned, and wherein the second compression load absorption member and the second connection member define a second aperture in which the second breakaway element is positioned.

5. The side impact battery protection bracket system of claim 1, wherein the first and second breakaway elements are in the form of shear pins configured to separate upon the application of a shear force of a defined magnitude.

6. The side impact battery protection bracket system of claim 1, wherein each of the connection members define one or more steps or contours configured to correspondingly meet with one or more steps or contours defined by each of the compression load absorption members, thereby enabling a weight of the battery pack to be distributed over a surface area of the compressive load absorption members.

7. A side impact battery pack release bracket configured to enable physical separation of a battery pack from an electric vehicle, the side impact battery release bracket comprising:
    a first lateral connection member operably coupled to a frame of the electric vehicle, the first lateral connection member having a first angled face positioned at an acute angle relative to a horizontal axis of the electric vehicle;
    a second lateral connection member operably coupled to the battery pack, the second lateral member having a second angled face positioned configured to mate with the first angled face, such that the first and second angled faces are positioned against one another and a generally planar configuration; and
    a breakaway element configured to secure the first lateral connection member to the second lateral connection member, whereupon application an external force to a side of the vehicle causes a shear force between the first angled face and the second angled face, causing the breakaway element to break into two or more parts, thereby providing a disconnection between the first lateral member and the second lateral member.

8. The side impact battery pack release bracket of claim 7, wherein the first angled face is positioned at an angle of 45° relative to at least one of an x- or y axis of the electric vehicle.

9. The side impact battery pack release bracket of claim 7, wherein the breakaway element is in the form of a shear pin configured to separate upon the application of a shear force of a defined magnitude.

10. The side impact battery pack release bracket of claim 7, wherein a momentum of the battery pack can aid in separation of the battery pack from the vehicle.

11. An electric vehicle including side impact battery pack protection mechanism for reducing damage to a battery pack in the event of a side impact, the electric vehicle comprising:
    a vehicle frame;
    a battery pack; and
    one or more side impact battery pack protection brackets configured to enable the vehicle battery pack to shift along a vehicle width direction,
    wherein the one or more side impact battery pack protection brackets comprises a first compression load absorption member operably coupled to a first side of the electric vehicle and a first connection member operably coupled to a first side of the battery pack, wherein the first compression load member is secured to the first connection member by a first breakaway element; and
    a second compression load absorption member operably coupled to a second side of the electric vehicle and a second connection member operably coupled to a second side of the battery pack, wherein the second compression load member is secured to the second connection member by a second breakaway element;

wherein in the event of an application of an external force to a side of the electric vehicle either of the first or second breakaway elements break, thereby creating a separation between the respective compression load absorption member and connection member, while the compression load absorption member positioned on the opposite side of the battery pack compresses, thereby dissipating the external force transmitted to the battery pack, and wherein each of the first and second compression load absorption members are configured to buckle upon application of the external force of a defined magnitude, wherein the external force of the defined magnitude is lower than a force capable of deforming the battery pack.

12. The electric vehicle of claim 11, wherein each of the first and second compression load absorption members comprise a thin-walled structure having a plurality of walls defining a hollow interior configured to collapse upon the application of the external force of the defined magnitude.

13. The electric vehicle of claim 11, wherein each of the first and second compression load absorption members comprise an attachment tab configured to enable operable coupling of the compression load absorption member to the respective connection member.

14. The electric vehicle of claim 11, wherein the first compression load absorption member and the first connection member define a first aperture in which the first breakaway element is positioned, and wherein the second compression load absorption member and the second connection member define a second aperture in which the second breakaway element is positioned.

15. An electric vehicle including side impact battery pack protection mechanism for reducing damage to a battery pack in the event of a side impact, the electric vehicle comprising:
 a vehicle frame;
 a battery pack; and
 one or more side impact battery pack protection brackets configured to enable physical separation of the battery pack from the vehicle frame wherein the one or more side impact battery pack protection brackets comprises a first lateral connection member operably coupled to a frame of the electric vehicle, the first lateral connection member having a first angled face positioned at an acute angle relative to a horizontal axis of the electric vehicle;
 a second lateral connection member operably coupled to the battery pack, the second lateral member having a second angled face positioned configured to mate with the first angled face, such that the first and second angled faces are positioned against one another and a generally planar configuration; and
 a breakaway element configured to secure the first lateral connection member to the second lateral connection member, whereupon application an external force to a side of the vehicle causes a shear force between the first angled face and the second angled face, causing the breakaway element to break into two or more parts, thereby providing a disconnection between the first lateral member and the second lateral member.

16. The electric vehicle of claim 15, wherein the breakaway element is in the form of a shear pin configured to separate upon the application of a shear force of a defined magnitude.

17. The electric vehicle of claim 15, wherein a momentum of the battery pack can aid in separation of the battery pack from the vehicle.

* * * * *